(12) United States Patent
Narasimhan et al.

(10) Patent No.: US 10,034,002 B2
(45) Date of Patent: Jul. 24, 2018

(54) SIGNALING AND SELECTION FOR THE ENHANCEMENT OF LAYERS IN SCALABLE VIDEO

(71) Applicant: ARRIS Enterprises, Inc., Suwanee, GA (US)

(72) Inventors: Mandayam Narasimhan, San Diego, CA (US); Ajay K. Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/718,216

(22) Filed: May 21, 2015

(65) Prior Publication Data
US 2015/0341649 A1 Nov. 26, 2015

Related U.S. Application Data

(60) Provisional application No. 62/001,412, filed on May 21, 2014.

(51) Int. Cl.
*H04N 7/12* (2006.01)
*H04N 19/156* (2014.01)
(Continued)

(52) U.S. Cl.
CPC ........... *H04N 19/156* (2014.11); *H04N 19/14* (2014.11); *H04N 19/187* (2014.11); *H04N 19/30* (2014.11); *H04N 19/31* (2014.11); *H04N 19/34* (2014.11); *H04N 19/36* (2014.11); *H04N 19/46* (2014.11); *H04N 19/70* (2014.11); *H04N 21/238* (2013.01); *H04N 21/2362* (2013.01);
(Continued)

(58) Field of Classification Search
CPC ....... H04N 21/234327; H04N 21/6336; H04N 21/236; H04N 21/2365; H04N 21/435; H04N 21/235; H04N 21/8451; H04N 21/4347; H04N 21/2362
USPC ................... 375/240.26, E07.021
See application file for complete search history.

(56) References Cited

U.S. PATENT DOCUMENTS 5,818,531 A   10/1998 Yamaguchi
8,705,624 B2   4/2014 Gupta
(Continued)

FOREIGN PATENT DOCUMENTS

WO   2008/084184 A2   7/2008
WO   2008/085433 A2   7/2008
(Continued)

OTHER PUBLICATIONS

PCT Search Report & Written Opinion, RE: Application No. PCT/US2015/031903; dated Jul. 21, 2015.
(Continued)

*Primary Examiner* — Sathyanaraya V Perungavoor
*Assistant Examiner* — Peet Dhillon
(74) *Attorney, Agent, or Firm* — Lori Anne D. Swanson

(57) ABSTRACT

A method is provided for signaling individual layer parameters in a transport stream that includes: indicating, using a supplemental enhancement information (SEI) message in the video stream, operation point information; inserting the operation point information in the transport stream using an operation point descriptor; and providing the operation point descriptor in a Program Map Table (PMT).

9 Claims, 8 Drawing Sheets

(51) Int. Cl.

| | |
|---|---|
| *H04N 19/34* | (2014.01) |
| *H04N 19/36* | (2014.01) |
| *H04N 19/31* | (2014.01) |
| *H04N 19/30* | (2014.01) |
| *H04N 19/187* | (2014.01) |
| *H04N 19/14* | (2014.01) |
| *H04N 21/2343* | (2011.01) |
| *H04N 21/238* | (2011.01) |
| *H04N 19/70* | (2014.01) |
| *H04N 21/434* | (2011.01) |
| *H04N 21/44* | (2011.01) |
| *H04N 19/46* | (2014.01) |
| *H04N 21/2362* | (2011.01) |

(52) U.S. Cl.
CPC . *H04N 21/234327* (2013.01); *H04N 21/4345* (2013.01); *H04N 21/4347* (2013.01); *H04N 21/44004* (2013.01)

(56) References Cited

U.S. PATENT DOCUMENTS

| | | | |
|---|---|---|---|
| 9,325,997 | B2 | 4/2016 | Deshpande |
| 9,326,005 | B2 | 4/2016 | Terada |
| 2005/0254575 | A1 | 11/2005 | Hannuksela et al. |
| 2007/0091919 | A1 | 4/2007 | Sandoval |
| 2007/0160126 | A1 | 7/2007 | Van Der Meer |
| 2007/0230564 | A1* | 10/2007 | Chen .............. H04N 21/234327 375/240.01 |
| 2007/0291837 | A1* | 12/2007 | Eleftheriadis .. H04N 21/234327 375/240.02 |
| 2008/0159384 | A1 | 7/2008 | Civanlar |
| 2009/0225870 | A1 | 9/2009 | Narasimhan |
| 2011/0002397 | A1 | 1/2011 | Wang |
| 2011/0012944 | A1 | 1/2011 | Park |
| 2011/0012994 | A1 | 1/2011 | Park |
| 2011/0032999 | A1* | 2/2011 | Chen .............. H04N 21/234327 375/240.26 |
| 2011/0110436 | A1 | 5/2011 | Schierl |
| 2011/0274180 | A1 | 11/2011 | Lee |
| 2012/0230401 | A1 | 9/2012 | Chen |
| 2012/0230431 | A1 | 9/2012 | Boyce et al. |
| 2012/0230432 | A1 | 9/2012 | Boyce et al. |
| 2013/0010863 | A1 | 1/2013 | Wu |
| 2013/0114680 | A1 | 5/2013 | Leontaris |
| 2013/0128990 | A1 | 5/2013 | Narasimhan |
| 2013/0266077 | A1* | 10/2013 | Boyce .................... H04N 19/70 375/240.25 |
| 2014/0010291 | A1 | 1/2014 | He |
| 2014/0023138 | A1 | 1/2014 | Chen |
| 2014/0093179 | A1 | 4/2014 | Deshpande |
| 2014/0115100 | A1 | 4/2014 | Changuel |
| 2014/0181885 | A1 | 6/2014 | Rusert |
| 2014/0301476 | A1 | 10/2014 | Deshphande |
| 2014/0301482 | A1 | 10/2014 | Narasimhan |
| 2015/0016547 | A1 | 1/2015 | Tabatabai et al. |
| 2015/0195532 | A1 | 7/2015 | Nakagami |
| 2015/0229966 | A1* | 8/2015 | Choe .................... H04N 19/597 348/43 |
| 2015/0256838 | A1 | 9/2015 | Deshpande |
| 2015/0341644 | A1 | 11/2015 | Narasimhan |
| 2015/0341649 | A1 | 11/2015 | Narasimhan |
| 2016/0044324 | A1 | 2/2016 | Deshpande |
| 2016/0156914 | A1 | 6/2016 | Suehring |

FOREIGN PATENT DOCUMENTS

| | | |
|---|---|---|
| WO | 2014/168890 A1 | 10/2014 |
| WO | 2014/168893 A1 | 10/2014 |

OTHER PUBLICATIONS

"Text of ISO/IEC 13818-1:2013 PDAM 7 Carriage of Layered HEVC", 108th MPEG Meeting (Motion Picture Expert Group or ISO/IEC JTC1/SC29/WG11), May 8, 2014.

"Text of ISO/IEC 13818-1:2013/FDAM 3 Carriage of HEVC", 105th MPEG Meeting (Motion Picture Expert Group or ISO/IEC JTC1/SC29/WG11), Sep. 6, 2013.

PCT International Search Report, RE: Application No. PCT/US2015/0318971, dated Jul. 17, 2015.

S. Narasimhan, et al., "Consideration of buffer management issues and layer management in HEVC scalability", 14th JCT-VC Meeting (Joint Collaborative Team on Video Coding of ISO/IEC JTC1/SC29/WG11 and ITU-T SG.16), Jul. 24, 2013.

Anonymous, "Text ISO/IEC 13818-1:2007/FPDAM32 Carriage of SVC in MPEG-2 Systems", 83rd MPEG Meeting (Motion Picture Expert Group or ISO/IEC JTC1/SC29/WG11), Feb. 7, 2008.

S. Narasimhan, et al., "Multilayer HRD Management", 15th JCT-VC Meeting Joint Collaborative Team on Video Coding of ISO/IEC JTC1/SC29/WG11 and ITU-T SG.16), Oct. 24, 2013.

PCT Search Report & Written Opinion, RE: Application #PCT/US2014/033236; dated Jul. 2, 2014.

S. Narasimhan, et al., "Signaling Framework to Support HEVC Scalability", 101st MPEG Meeting (Motion Picutre Expert Group or ISO/IEC/JTC1/SC29/WG11), Jul. 11, 2012, 2 pgs.

Anonymous, "Requirements of the Scalable Enhancement of HEVC", 101st MPEG Meeting (Motion Picture Expert Group or ISO/IEC/JTC1/SC29/WG11), Aug. 3, 2012, 12 pgs.

J. Chen, et al., "SHVC Working Draft 1", 12th JCT-VC Meeting (Joint Collaborative Team on Video Coding of ISO/IEC/JTC1/SC29/WG11 and ITU-T SG.16), Mar. 20, 2013, 34 pgs.

J. Boyce, et al., "VPS Support for Out-of-Band Signaling and Hybrid Codec Scalability", JCTVC-K0206, Oct. 1, 2012, 6 pgs.

PCT Search Report & Written Opinion, RE: Application #PCT/US2014/033231; dated Jul. 4, 2014.

Y-K Wang, et al., "SVC hypothetical reference decoder (HRD)", 21st JVT Meeting, 78th MPEG Meeting; Oct. 20, 2006.

P A Chou, et al., "A generalized hypothetical reference decoder for H.264/AVC", IEEE Transactions on Circuits and Systems for Video Technology, vol. 13, No. 7, Jul. 1, 2013.

J. Chen, et al., "SHVC Draft Text 1", Document of Joint Collaborative Team on Video Coding, JCTVC-L1008, Jan. 14-23, 2013.

J. Boyce, et al., "VPS Support for Out-of-Band Signaling and Hybrid Codec Scalability", Vidyo Personal Telepresence, JCTVC-K0206, Oct. 1, 2012, 6 pgs.

\* cited by examiner

SIGNALING AND SELECTION FOR THE ENHANCEMENT OF LAYERS IN SCALABLE VIDEO

CROSS-REFERENCES TO RELATED APPLICATIONS

The present disclosure claims priority to U.S. Provisional App. No. 62/001,412, entitled "Transport of SHVC and support for compelling use cases", filed May 21, 2014, the contents of which is incorporated herein by reference in its entirety. The present disclosure is related to PCT App. No. PCT/US2014/033236, entitled "Signaling for Addition or Removal of Layers in Video Coding", filed Apr. 7, 2014, the contents of which is incorporated herein by reference in its entirety. The present disclosure is also related to U.S. patent application Ser. No. 14/718,188, entitled "Individual Buffer Management in Scalable Video," and incorporated by reference in its entirety. The present disclosure is also related to U.S. patent application Ser. No. 14/718,203, entitled "Signaling for Addition or Removal of Layers in Scalable Video," and incorporated by reference in its entirety.

BACKGROUND

Scalable video coding supports decoders with different capabilities. An encoder generates multiple encoded bitstreams for an input video. This is in contrast to single layer coding, which only uses one encoded bitstream for a video. In the scalable video coding, one of the output encoded bitstreams, referred to as the base layer (BL), can be decoded by itself and this encoded bitstream provides the lowest scalability level of the video output. To achieve a higher level of video output, the decoder can process the base layer bitstream together with other encoded bitstreams, referred to as enhancement layers (EL). The enhancement layer may be added to the base layer to generate higher scalability levels. One example is spatial scalability, where the base layer represents the lowest resolution video and the decoder can generate higher resolution video using the base layer bitstream together with additional enhancement layer bitstreams. Thus, using additional enhancement layer bitstreams produce a better quality video output, such as by achieving temporal, signal-to-noise ratio (SNR), and spatial improvements.

In scalable video, an encoder may encode the base layer and enhancement layers. Further, parameter settings may be determined for the layers. For example, parameter settings for the base layer and any combination of the base layer and enhancement layers are determined That is, if a combination of a base layer and an enhancement layer is available, the parameter settings govern the combined base layer and enhancement layer. The parameter settings may then be included in a video layer of the encoded bitstreams for the encoded base layer and enhancement layers. The pre-encoded video data is then stored in storage, such as an archive that stores the encoded layers and parameter settings. When a transmitter wants to send the video to one or more decoders, the transmitter may retrieve the encoded bitstreams for the applicable layers from storage and send the encoded bitstreams to the decoder.

When the user wants to add a layer for the video to the already encoded layers, the parameter settings for the layers stored in storage do not take into account the presence of the additional layer. To account for the additional layer, the parameter settings must be changed to reflect the addition of the layer. For example, changes to both the video layer and the transport stream for all of the pre-encoded layers may need to be changed for each picture. This is because the parameter settings for the base layer and enhancement layers are being governed by the combination of the enhancement layers with the base layer and thus the parameter settings may be dependent on the newly added enhancement layer. This introduces major complexity for re-distribution transmission equipment that send the pre-encoded video stream.

While the above relates to video encoding, similar problems exist for creating and managing MPEG-2 transport streams, which may include multiple streams including scalable video streams. MPEG-2 is the designation for a group of such standards, promulgated by the Moving Picture Experts Group ("MPEG") as the ISO/IEC 13818 international standard. A typical use of MPEG-2 is to encode audio and video for broadcast signals, including signals transmitted by satellite and cable. Thus, MPEG-2 transport streams may be prone to issues related to adding and deleting layers due to the multiple layers in a scalable video stream.

Additionally, for decoders at receiving devices to retrieve transport streams having acceptable parameters without having to examine each layer for rendering capabilities is desirable.

SUMMARY

In one embodiment of the present invention, a method is provided for signaling individual layer parameters in a transport stream includes: indicating, using a supplemental enhancement information (SEI) message in the video stream, operation point information; inserting the operation point information in the transport stream using an operation point descriptor; and providing the operation point descriptor in a Program Map Table (PMT).

In another embodiment, a method of signaling operation points in a transport stream includes: indicating, using a supplemental enhancement information (SEI) message in the video stream, operation point information, wherein the SEI message signals a rendering capability value that describes the rendering capability to be satisfied by a receiving device to use the operation point information; inserting the operation point information in the transport stream using one or more operation point descriptors; and providing the one or more operation point descriptors in a Program Map Table (PMT).

The following detailed description and accompanying drawings provide a better understanding of the nature and advantages of particular embodiments.

DETAILED DESCRIPTION

Described herein are techniques for a system to add or remove enhancement layers. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

As provided herein, some embodiments add or remove enhancement layers from pre-encoded (or compressed) video that has been stored (e.g., archived). The pre-encoded layers are encoded without taking into account the additional layer. Layers may be added to increase the quality of the video, such as increasing the frame rate or picture sizes of the video. Some embodiments provide the ability to add layers using multiple signaling mechanisms. A first mechanism uses the video stream parameter sets to indicate that there may be new layers that may be added in future and the explicit parameters for these new layers (such as video data rate, buffer size, and how these new layers are combined with other layers) will be signaled. When the signaling that new layers may be added is embedded in the video layer for pre-encoded content, there is no need to alter prior video data at re-distribution transmission points. That is, layer parameter settings for the pre-encoded video do not need to be changed. Some embodiments also provide new descriptors, such as in the transport stream that signal the new layer parameters and any changes to parameters for the pre-encoded layers.

In addition, some embodiments add or remove enhancement layers in the transport streams. These layers may be added using multiple signaling mechanisms such as video parameter set (VPS) and new descriptors in the transport streams such as video descriptors and hierarchy descriptors.

Particular embodiments provide "operation points", where a decoder can extract a set of layers from the video to match the display system capabilities of a receiving device. The operation points may be signaled using multiple signaling mechanisms, including indirect signaling and explicit signaling. In some embodiments, the operation points correspond to various views of a program, providing information such as the size of pictures, frame rate of pictures, whether two-dimensional or three-dimensional, etc.

Figure 1:
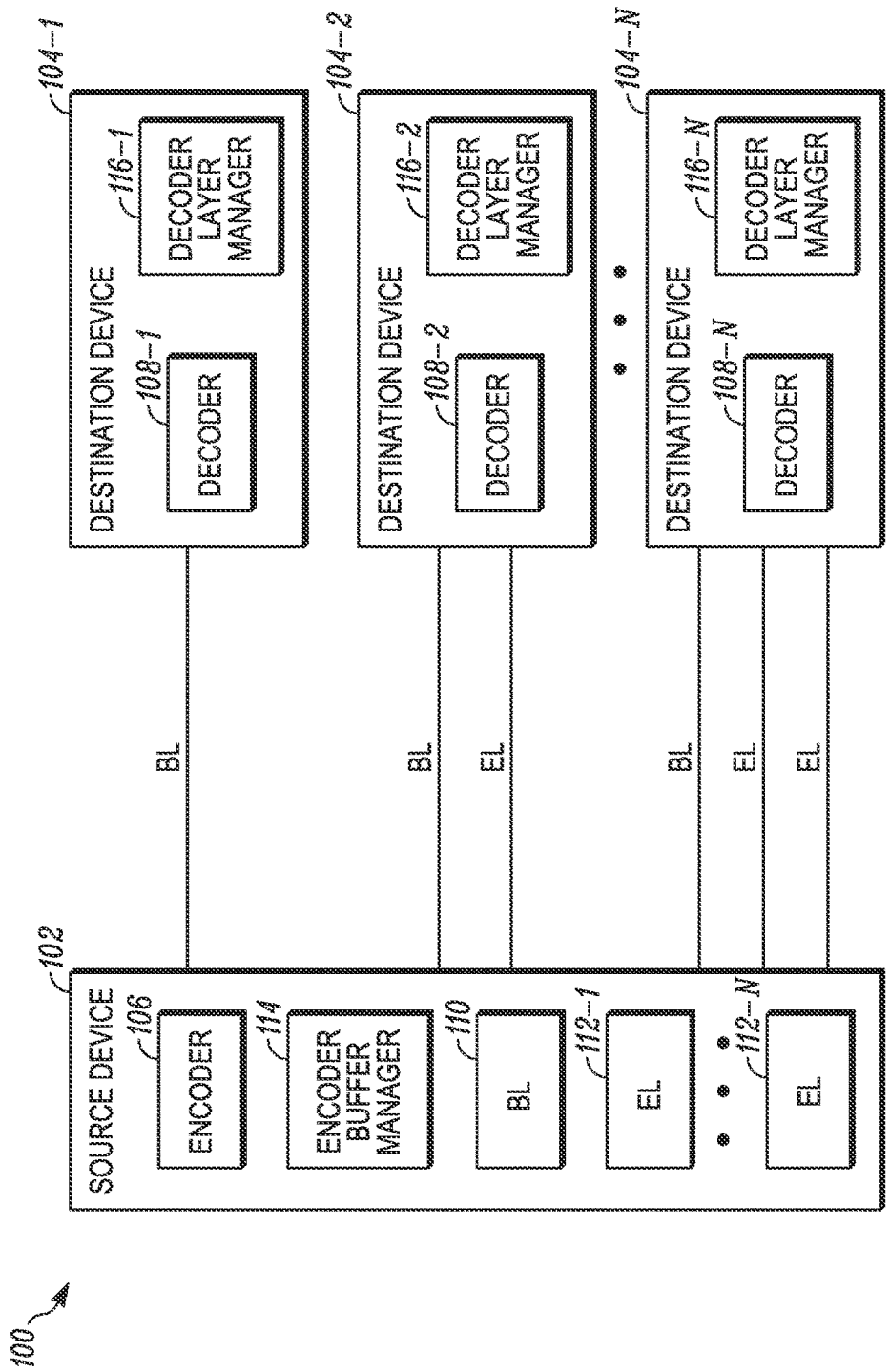
FIG. 1 depicts a system for providing scalable video with the capability of adding additional layers or removing layers according to one embodiment.

FIG. 1 depicts a system 100 for providing scalable video with the capability of adding additional layers or removing layers according to one embodiment. System 100 includes a source device 102 and a plurality of destination devices 104-1-104-N. Source device 102 includes an encoder 106 and each destination device 104-1-104-N includes a respective decoder 108-1-108-N. Source device 102 may be a device that transmits encoded video to destination devices 104. In one embodiment, source device 102 may include a server or any other networking device or system that can encode video and transmit encoded video. Destination devices 104 may include devices that are capable of decoding the encoded video. Destination devices 104 may include networking devices, set top boxes, cellular phones, televisions, and any other computing devices.

In scalable video coding, such as in High Efficiency Video Coding (HEVC) scalable video coding, encoder 106 may generate multiple bitstreams for an input video. Although HEVC is mentioned, other video coding standards may apply. As mentioned above, the base layer may be decoded by itself and provides the lowest scalability level of the video output, and additional enhancement layers may be combined with the base layer to generate higher scalability levels. The enhancement layers enhance other layers, such as zero or more enhancement layers and the base layer. As shown, encoder 106 may generate a base layer (BL) 110 and any number of enhancement layers (EL) 112-1-112-N.

Destination devices 104 may request different layers from source device 102 depending on the destination device's capabilities. Source device 102 always needs to send base layer 110 to destination devices 104. However, source device 102 may send any number of enhancement layers 112 to destination devices 104 including no enhancement layers 112. As shown in FIG. 1, destination device 104-1 only receives base layer 110. In this case, destination device 104-1 may only have the capability of generating the lowest resolution video. Destination device 104-2 receives the base layer 110 and one enhancement layer 112-1. Decoder 108-2 can combine the base layer 110 and enhancement layer 112-1 to generate a higher resolution video. Also, destination device 104-N receives base layer 110 and enhancement layers 112-1-112-N. Decoder 108-N combines base layer 110 and the received enhancement layers 112-1-112-N. The above process may save bandwidth. For example, decoder 108-1 may only be able to decode the base layer and thus not receiving the enhancement layers may reduce the bandwidth required to send the video stream to destination device 104-1. The same is true for destination device 104-2 as less enhancement layers are sent to destination device 104-2 than to device 104-N.

By providing a plurality of operation points to the destination devices 104, the destination device 104 may select which layers to receive, based on the destination device's 104 capabilities. For example, different operation points signal the combinations of base and other layers so that the destination devices can select the appropriate operation point (or combination to decode) based on their resources. As an example, if a transmission that includes 720P30 enhanced to 720P60 and further enhanced to 1080P60 with 3D, signals three operation points—720P30, 720P60 and 3D 1080P60, destination devices can choose the right operation point based on whether they are displaying video on a tablet, or HDTV, or 3DTV, respectively. Thus, in some embodiments, the operation point may indicate the type of enhancement available to the destination devices.

An encoder layer manager 114 and decoder layer managers 116-1-116-N may manage layers to allow the capability to support additional layers or the removal of layers for the video. As will be discussed in more detail below, base layer 110 and enhancement layers 112-1-112-N for a video may be pre-encoded (e.g., pre-compressed) and stored (e.g., archived). Parameter settings for the layers may be included in the pre-encoded bitstreams in the video layer or transport stream. Also, layer parameter settings for the transport stream may also be stored. These layer parameter settings were included in the encoded bitstreams before the existence of the additional layer and did not take into account the additional layer. Encoder layer manager 114 and decoder layer manager 116 may allow the addition or removal of an enhancement layer for the pre-encoded video without having to adjust the layer parameter settings for the pre-encoded bitstreams. This process will be described in more detail below.

Figure 2:
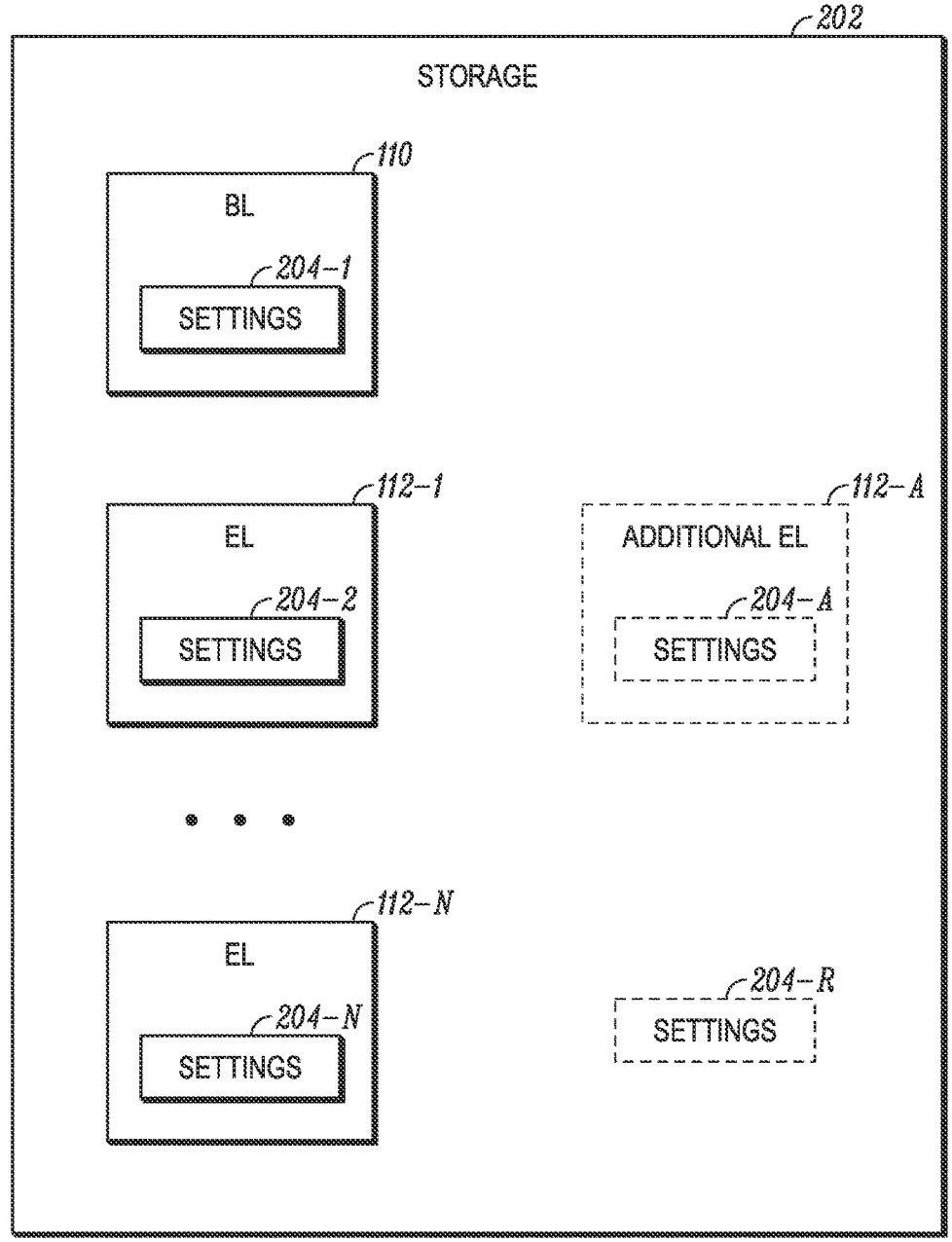
FIG. 2 depicts an example of storage that includes pre-encoded video according to one embodiment.

FIG. 2 depicts an example of storage 202 that includes pre-encoded video according to one embodiment. As shown, storage 202 includes base layer 110 and enhancement layers 112-1-112-N. Base layer 110 and enhancement layers 112 have been encoded previously and stored in storage 202. For example, as discussed above, storage 202 may be an archive that is storing the pre-compressed content. In some embodiments, storage 202 may include transport streams. The transport streams can include one or more pre-encoded video.

As shown, each layer may include layer parameter settings. For example, base layer 110 includes layer parameter settings 204-1; enhancement layer 112-1 includes layer parameter settings 204-2; and enhancement layer 112-N includes layer parameter settings 204-N. Each layer parameter setting may include parameters that may be used to encode and/or decode the respective layer. In one example, a respective parameter setting 204 may include parameters that individually manage a buffer that is only storing the specific layer. For example, base layer 110 and enhancement layers 112 may be individually stored in a set of buffers. Decoder 108 may manage the individual buffers based on the buffer parameter settings. In one embodiment, parameter settings may manage the video bitrate, buffer size, and how respective layers are combined with other layers.

Some embodiments allow for an additional enhancement layer 112-A to be added to already encoded video without changing layer parameter settings for the already encoded video that did not take into account additional enhancement layer 112-A. With the addition of additional enhancement layer 112-A, additional layer parameter settings 204-A are also provided. Additional parameter settings 204-A allow encoder 106 and decoder 108 to add additional enhancement layer 112-A without having to change parameter settings 204-1-204-N for base layer 110 and enhancement layers 112-1-112-N, respectively. In one embodiment, these parameter settings may be included in the video layer and may be difficult to change. Also, any parameter settings included the transport stream may also not need to be changed when additional enhancement layer 112-A is added.

Some embodiments allow for an additional enhancement layer 112-A to be added to already encoded video in a transport stream without changing transport stream parameter settings for the already encoded video that did not take into account additional enhancement layer 112-A. With the addition of additional enhancement layer 112-A, additional transport stream parameter settings 204-A are also provided. Additional transport stream parameter settings 204-A allow encoder 106 and decoder 108 to add additional enhancement layer 112-A without having to change transport stream parameter settings 204-1-204-N for base layer 110 and enhancement layers 112-1-112-N, respectively. In one embodiment, these parameter settings may be included in the video layer and may be difficult to change. Also, any transport stream parameter settings included the transport stream may also not need to be changed when additional enhancement layer 112-A is added.

As will be described in more detail below, additional layer parameter settings 204-A may detail information needed to add enhancement layer 112-A. This information may include relationships between additional enhancement layer 112-A and any layers stored in storage 202 and/or changes to any parameter settings 204-1-204-N that are stored in storage 202. In one embodiment, additional layer parameter settings 204-A may include layer-specific information and also layer-dependent information. Layer-specific information may be specific to a certain layer. For example, the layer-specific information may be individual buffer management parameters for a respective layer. The buffer management parameters may be for additional enhancement layer 112-A or for any other layer stored in storage 202. The layer-dependent information may be information that affects other layers. For example, the layer-dependent information may include a layer hierarchy that indicates the hierarchy of the enhancement layers. This layer hierarchy may change with the addition of enhancement layer 112-A. Further, what layers should be combined with additional layer 112-A may also be included in the layer-dependent information. For example, the base layer may be combined with three enhancement layers and additional layer parameter settings 204-A may specify which three layers should be combined with the base layer based on the addition of additional layer 112-A.

In some embodiments, the layer-specific information and layer-dependent information are provided by the video descriptor and hierarchy descriptor in a transport stream. The layer-specific information may include, for example, buffer management parameters such as maximum buffer size and maximum bit rate for each layer in the transport stream. The layer-dependent information may include, for example, the hierarchy or order and specificity of layers to be requested by and/or transmitted to decoder 108.

In some embodiments, an operation point descriptor is provided in the transport stream. The operation point descriptor provides individual transport stream parameters and rendering capability values for one or more layers in the transport stream. In some embodiments, the operation point descriptor includes enhancement parameters for one or more layers in the transport stream. For example, the operation point descriptor may signal the type of scalable enhancement available, such as spatial, temporal, signal-to-noise ratio (SNR), view-texture and view-depth scalability.

In some embodiments, the operation point may signal additional scalable enhancements such as high dynamic range (HDR) and wide color gamut (WCG). In other embodiments, the video descriptor may signal HDR and/or WCG enhancements and buffer parameters for the enhancements. In still other embodiments, the hierarchy descriptor may signal HDR and/or WCG enhancements and layer assembly for the enhancements.

Some embodiments may also remove a layer. In this case, one of enhancement layers 112-1-112-N may be removed from being used in decoding the video. When removal occurs, a removed layer parameter setting 204-R may be provided. Parameter settings in removed layer parameter settings 204-R may be used to manage decoding of the remaining layers upon removal. For example, removed layer parameter settings 204-R may detail any information in parameter settings 204-1-204-N that need to be changed based on the removal of the layer, such as any changes in the hierarchy or which layers combine with each other may be changed. In one example, the hierarchy may be changed based on the removal of an enhancement layer. Further, any combination that includes the removed layer may be changed by layer parameters settings 204-R.

In some embodiments, the hierarchy descriptor in the transport stream provides which layers have been removed. The hierarchy descriptor may additionally provide a modified order and specificity of layers based on the removal of one or more layers. In some embodiments, the removal of a layer is provided in a program map table (PMT). The hierarchy descriptor is provided in more detail below.

The additional layer parameter settings 204-A (and removed layer parameter settings 204-R) may be sent from encoder 106 to decoder 108 using different methods. For example, particular embodiments provide the ability to add layers using multiple signaling mechanisms. The first mechanism uses a video layer parameter, such as a VPS, a sequence parameter set (SPS), video usability information (VUI), and/or supplemental enhancement information (SEI), to indicate that in the future there may be new layers. The second signaling mechanism may signal the explicit parameters for these new layers (such as video data rate, buffer size, and how these new layers are combined with other layers) in a transport stream (or the video stream).

Encoder layer manager 114 may be part of re-distribution transmission equipment that is sending the video stream or transport stream to decoders 104. Encoder layer manager 114 may signal additional layer parameter settings 204-A in-band or out-of-band with the encoded bitstreams for base layer 110 and enhancement layers 112. In-band may mean the additional layer parameter settings 204-A may be sent in a VPS or SPS and out-of-band may be where additional layer parameter settings 204-A are sent in a systems layer using the transport stream.

Figure 3:
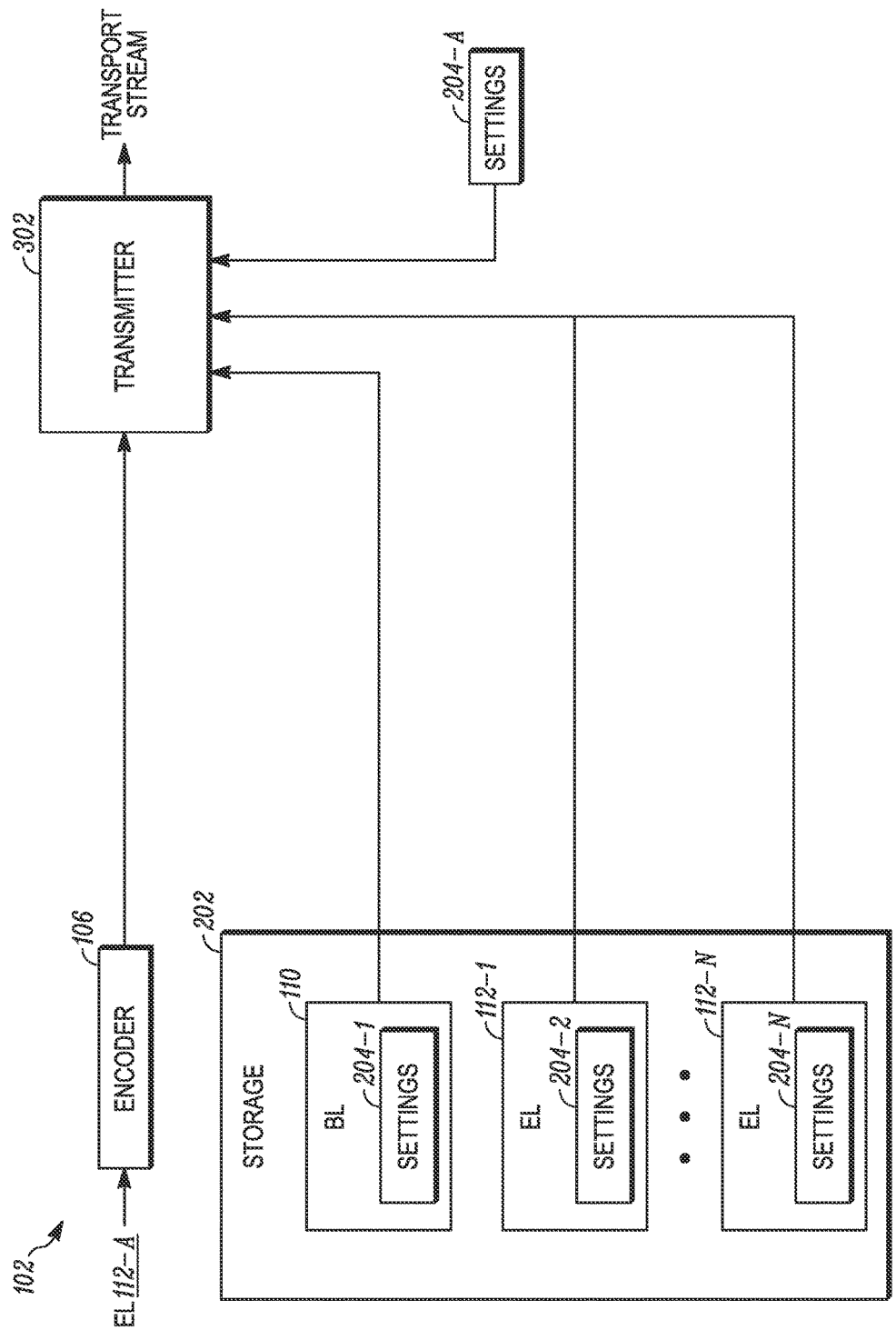
FIG. 3 depicts an example of a source device for sending the additional layer and/or additional layer parameter settings according to one embodiment.

The following will now describe source device 102 and destination device 104 in more detail. FIG. 3 depicts an example of source device 102 for sending the additional layer 112-A and/or additional layer parameter settings 204-A according to one embodiment. Because base layer 110 and enhancement layers 112-1-112-N have been already encoded and stored in storage 202, encoder 106 does not have to encode these layers again. Although not re-encoding video for base layer 110 and enhancement layers 112-1-112-N is discussed, encoder 106 may also re-encode these layers.

Encoder 106 encodes the new enhancement layer 112-A into an encoded bitstream. The encoded bitstream for enhancement layer 112-A may be used to enhance base layer 110 (and other enhancement layers), such as by increasing the frame rate or resolution.

Transmitter 302 receives base layer 110 and enhancement layers 112-1-112-N and additional enhancement layer 112-A, and transmits the bitstreams to a destination device 104. For example, as discussed above, different destination devices 104 may combine and decode different layers depending on their capabilities. The destination devices may retrieve the different layers using information provided in one or more operation points. Transmitter 302 may determine which layers have been requested by a destination device 104 and send those layers in a transport stream. In one embodiment, transmitter 302 may packetize the encoded bitstreams for the requested layers in a packetized elementary stream (PES) and send the packets in the transport stream to destination device 104.

Transmitter 302 may also send layer parameter settings 204 for additional enhancement layer 112-A (or any of the layers being sent) in the transport stream, hereinafter referred to as transport stream parameter settings. In some embodiments, a parameter may be first set in the video layer (in the encoded bitstream of one of the pre-encoded bitstreams) that indicates that the video stream may include additional layers and the additional layer parameters may be found in the transport stream. In one embodiment, the parameter indicating the video stream may include additional layers may be set in the pre-encoded video bitstream or dynamically set when the additional layer is added.

Transmitter 302 then sends additional transport stream parameter settings 204-A in packets included in the transport stream. In one example, transport stream parameter setting 204-1 for base layer 110 may be sent in the encoded bitstream that is encapsulated in packets in the transport stream. This transport stream parameter setting 204-1 may be the same parameter setting stored in storage 202. Also, for any enhancement layers 112 that are sent from storage 202, the respective transport stream parameter settings 204 are also sent in the encoded bitstream included in the packets in the transport stream. These are also the same transport stream parameter settings 204 that are stored in storage 202. Transport stream parameter settings 204 may also be sent in the transport stream in packets.

In another embodiment, if the removal of a layer is performed, transmitter 302 includes removed layer parameter settings 204-R in packets included in the transport stream, hereinafter also referred to as transport stream parameter settings. In this case of removing a layer, an encoded bitstream for the removed enhancement layer is not included in the transport stream.

Figure 4:
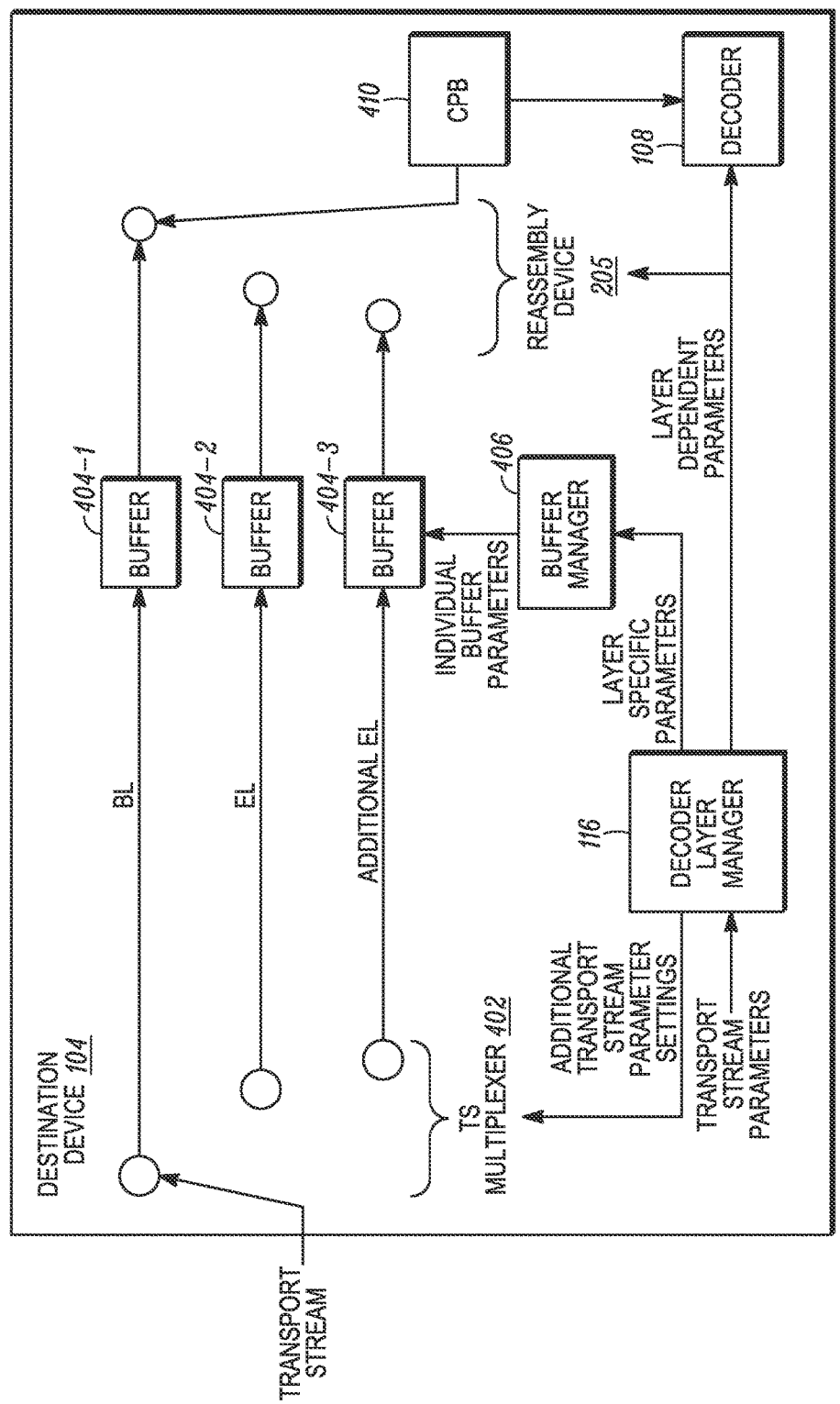
FIG. 4 depicts a more detailed example of a destination device for decoding bitstreams using additional layer parameter settings according to one embodiment.

Destination device 104 receives the transport stream and then decodes the encoded bitstreams found in the transport stream using the transport stream parameter settings. FIG. 4 depicts a more detailed example of destination device 104 for decoding bitstreams using additional transport stream parameter settings 204-A according to one embodiment. The transport stream is received at a transport stream (TS) demultiplexer 402. The transport stream may be an encoded bitstream that may be packets that include the encoded bitstream for all layers intermixed. Each packet may include information for a single layer, however, and are identified via a packet identifier (PID) for the respective layer. TS demultiplexer 402 uses the packet identifier to demultiplex the transport stream. That is, TS demultiplexer 402 forwards transport stream packets to various buffers that handle respective layers. In one example, TS demultiplexer 402 sends the packets for base layer 110 in a first stream and TS demultiplexer 402 sends packets for enhancements layers 112 in second and third streams, respectively.

Buffers 404-1-404-3 are included in a single destination device 104. Buffer 402-1 receives base layer 110 from encoder 106, and buffers 404-2-404-3 receive respective an enhancement layer 112 and additional enhancement layer 112-A.

Decoder layer manager 116 receives the transport stream parameter settings 204 from the packets included in the transport stream. This includes respective transport stream parameter settings for the layers included in the video layer or the transport stream. In one embodiment, decoder layer manager 116 determines that a setting in the video layer indicates an additional layer may be added, and then decoder layer manager 116 determines additional transport stream parameter settings 204-A from the transport stream.

Decoder layer manager 116 then uses additional transport stream parameter settings 204-A in the decoding process. As mentioned above, the additional transport stream parameter settings 204-A may include layer-specific parameter settings and layer-dependent parameter settings. Decoder layer manager 116 may apply layer-specific or layer-dependent settings in the decoding process. One example of layer-specific parameter settings is settings for buffers 404. In this case, decoder layer manager 116 may send buffer parameter settings to a buffer manager 406. Buffer manager 406 may then manage individual buffers for each respective layer. For example, individual buffer settings may be provided for buffer 404-1 for base layer 110 and buffers 404-2-404-3 for enhancement layers 112.

Buffer manager 406 manages the input and output of buffers 404-2-404-3 before base layer 119 and enhancement layers 112 are combined. That is, the layer-specific information may be for an individual buffer 404-3 that is buffering additional enhancement layer 112-A, such as a bitrate and buffer size parameters that are applied to buffer 404-3. Additionally, the layer-specific parameters may specify changes to buffer parameters that were stored in storage 202. In this case, different individual parameters for buffers 404-1-404-2 may be set by buffer manager 406 in light of additional transport stream parameter settings 204-A. In one embodiment, U.S. patent application Ser. No. 14/718,203, entitled "Individual Buffer Management in Scalable Video,", and incorporated by reference in its entirety, describes individual buffer management in more detail. Providing individual buffer management may allow the addition of additional enhancement layer 112-A because the buffer parameters are managed individually for layers and thus buffer parameters for pre-encoded layers do not need to be changed to add additional enhancement layer 112-A.

In some embodiments, transport streams provide for extensions of a system through the use of descriptors. A descriptor may include a data structure that may be used to extend the definition of programs or program elements. Examples of descriptors provided herein include video descriptor, hierarchy descriptor and operation point descriptor.

In some embodiments, a video descriptor in the transport stream may signal the additional transport stream parameter settings 204-A, such as the buffer parameter settings for additional enhancement layer 112-A. In some embodiments, the video descriptor may also signal additional transport stream parameter settings 204-A in a program map table (PMT) for the video.

In some embodiments, an operation point descriptor in the transport stream may signal a subset of views of a bitstream. The decoder layer manager 116 may use operation point descriptors to select one of the operation points to be decoded and presented to a user (e.g., via destination device 104). In this sense, the decoder layer manager 116 can extract a set of layers from the video to match the display system capabilities. In some embodiments, the destination device 104 may select an operating point based in the highest quality supported by one of the operation points for a bitstream. The operation point descriptor may provide a rendering capability, a bitrate capability and a bitrate for an operation point.

Decoder layer manager 116 may also manage layer-dependent parameter settings. In one embodiment, decoder layer manager 116 may send the layer-dependent parameter settings to buffer manager 406, decoder 108, or other components in the decoding process. In one example, the layer-dependent parameters include a hierarchy from additional transport stream parameter settings 204-A. The hierarchy indicates the layer hierarchy for the layers that are read out of buffers 404 to reassembly manager 408. For example, the layer hierarchy indicates the position of the enhancement layers for combination into the combined bitstream. Reassembly manager 408 may then reassemble a combined encoded bitstream from the layers read out of buffers 404 based on the layer hierarchy. Also, additional transport stream parameter settings 204-A may indicate to reassembly manager 408 which layers are combined with additional enhancement layer 112-A.

A coded picture buffer (CPB) 410 then stores pictures for the combined encoded bitstream. Decoder 108 reads the encoded pictures from coded picture buffer 410 and decodes the pictures. Also, decoder 108 may use parameters from additional transport stream parameter settings 204-A in decoding the pictures along with parameter settings from transport stream parameter settings 204-1-204-N. Once the pictures are decoded, decoder 108 then stores the decoded pictures in a decoded picture buffer.

Figure 5:
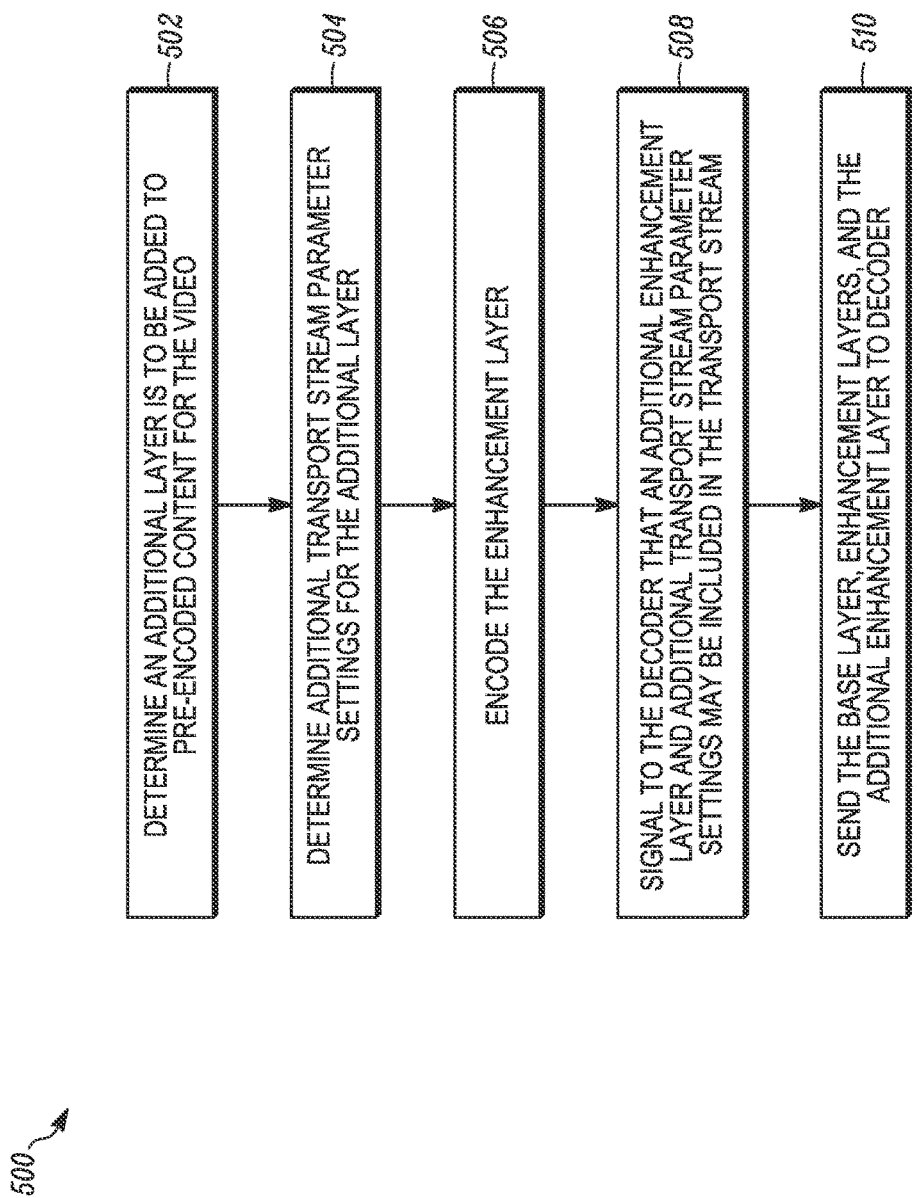
FIG. 5 depicts a simplified flowchart of a method for encoding video according to one embodiment.

FIG. 5 depicts a simplified flowchart 500 of a method for encoding video according to one embodiment. At 502, encoder 106 determines an additional layer is to be added to pre-encoded content for the video. At 504, encoder 106 determines additional transport stream parameter settings 204-A for the additional layer. Then, at 506, encoder 106 encodes enhancement layer 112-A.

At 508, transmitter 302 signals to decoder 108 that an additional enhancement layer 112-A and additional transport stream parameter settings 204-A may be included in the transport stream. For example, a setting in the video layer or transport stream may indicate this. At 510, transmitter 302 sends base layer 110, enhancement layers 112-1-112-N, and additional enhancement layer 112-A to decoder 108. This stream may include transport stream parameter settings 204-1-204-N. Also, at 512, transmitter 302 sends additional transport stream parameter settings 204-A to decoder 108.

Figure 6:
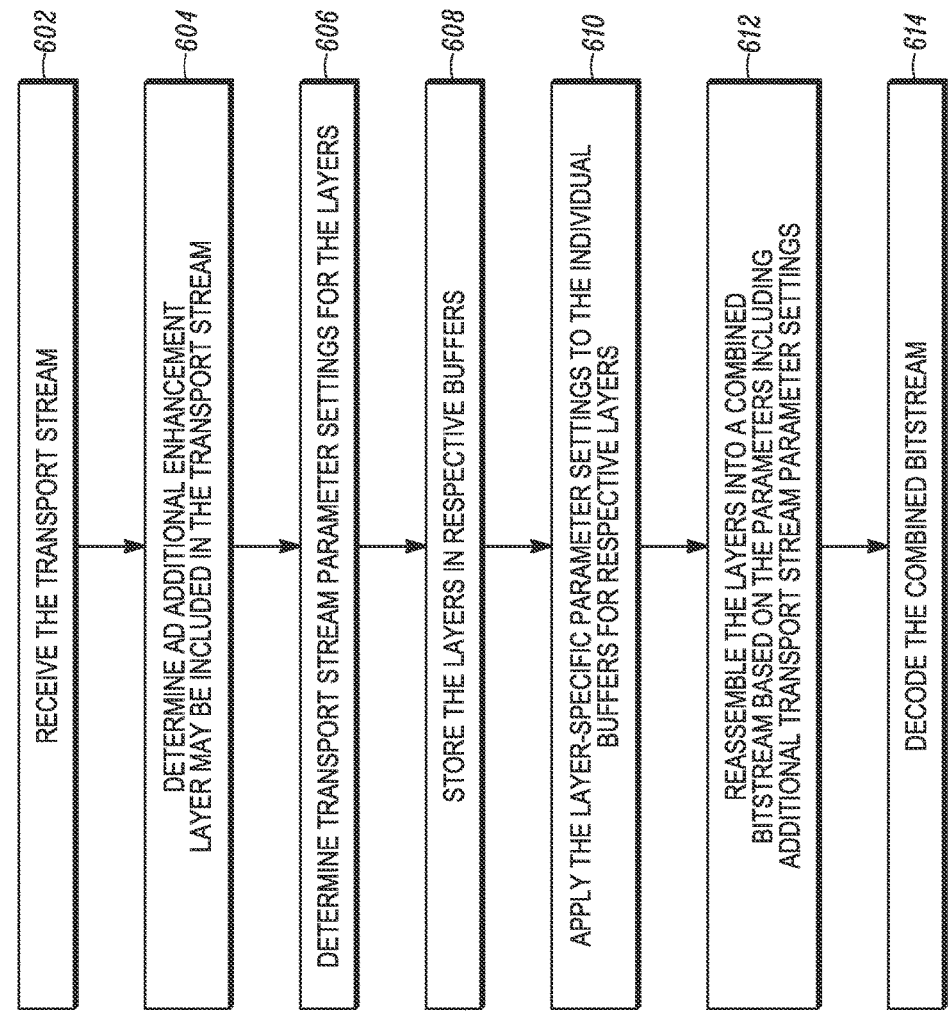
FIG. 6 depicts a simplified flowchart of a method for decoding a video stream according to one embodiment.

FIG. 6 depicts a simplified flowchart 600 of a method for decoding a scalable video stream according to one embodiment. At 602, decoder 108 receives the transport stream. At 604, decoder 108 determines an additional enhancement layer 112-A may be included in the transport stream. For example, the setting in the video layer or transport stream indicates additional layers may be included and additional transport stream parameter settings 204-A are included in the transport stream. At 606, decoder 108 determines transport stream parameter settings 204 for the layers. This includes determining additional transport stream parameter settings 204-A.

At 608, decoder 108 stores the layers in respective buffers 404. At 610, decoder 108 applies layer-specific parameter settings to the individual buffers for respective layers. At 612, decoder 108 reassembles the layers into a combined bitstream based on the parameters including additional transport stream parameter settings 204-A. Then, at 614, decoder 108 decodes the combined bitstream.

Figure 7:
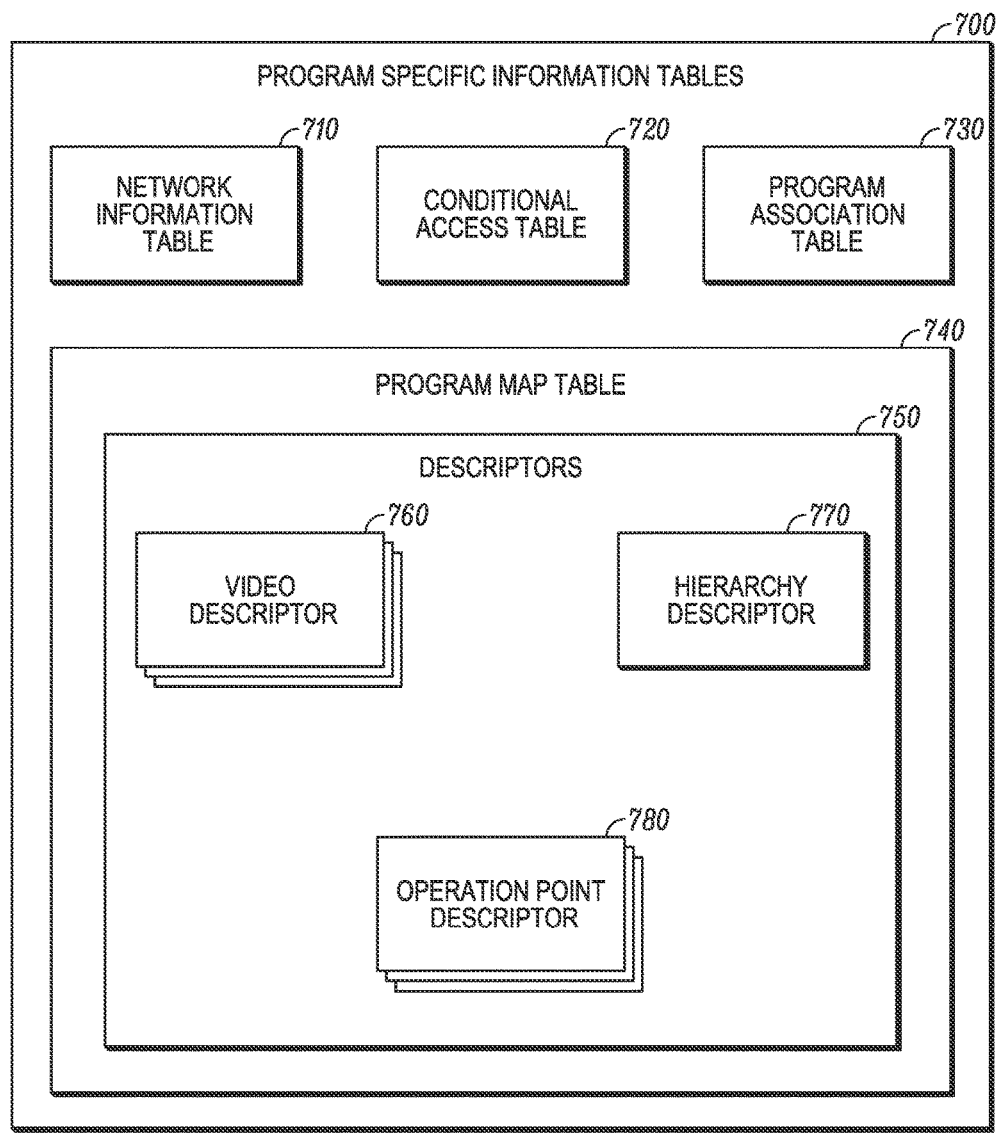
FIG. 7 depicts a block diagram illustrating an example set of program specific information tables according to one embodiment.

FIG. 7 is a block diagram illustrating an example set of program specific information tables 700. As provided above, TS demultiplexer 402 uses a packet identifier (PID) to demultiplex the transport stream. Program specific information, as included in program specific information table 700, may explicitly specify relationships between layers in the transport stream. As shown, program specific information tables 700 include network information table (NIT) 710, conditional access table (CAT) 720, program access table (PAT) 730, and program map table (PMT) 740.

PMT 740 may include details about the programs and the transport streams carrying programs. The basic program map table specified by MPEG-2 systems specification may be embellished with some of the many descriptors, e.g., descriptors 750, specified within the MPEG-2 systems specification. Descriptors 750 may include any or all of the specified descriptors of the MPEG-2 systems specification. In general, descriptors, such as descriptors 750, convey further information about a program or transport streams or sub-bitstreams. The descriptors may include video encoding parameters, audio encoding parameters, language identification, pan-and-scan information, conditional access details, copyright information, or other such information. A broadcaster or other user may define additional private descriptors.

Descriptors 750 include video descriptors 760, hierarchy descriptors 770, and operation point descriptors 780. Tables I, II and III describe the video descriptors 760, hierarchy descriptors 770, and operation point descriptors 780, in more detail below.

The following will describe an example of a syntax that may be used to signal additional transport stream parameter settings 204-A. As mentioned above, different signaling mechanisms may be used to signal the addition of a layer. In one embodiment, additional parameter settings 204-A may be included in a VPS, SPS, VUI, and/or SEI. The VPS and SPS may be embedded in the encoded bitstream of base layer 110 and/or enhancement layers 112 to indicate that an additional layer may be included and additional transport stream parameter settings 204-A may be included in the transport stream.

Additional transport stream parameter settings 204-A may be included in the transport stream in different ways. For example, a video descriptor may signal the additional transport stream parameter settings 204-A, such as the buffer parameter settings for additional enhancement layer 112-A. In some embodiments, additional transport stream parameter settings 204-A may be included in a hierarchy descriptor that includes information on how additional enhancement layer 112-A can be added to the pre-encoded layers in the same PMT.

The following shows an example of a scalable video descriptor in Table I. For example, a scalable HEVC video descriptor is used. The video descriptor provides basic information for identifying coding parameters of the associated video stream, such as profile and level parameters.

TABLE I

Scalable HEVC video descriptor

| Syntax | No. Of bits | Mnemonic |
| --- | --- | --- |
| Scalable HEVC_descriptor( ) { | | |
| descriptor_tag | 8 | uimsbf |
| descriptor_length | 8 | uimsbf |
| profile_idc | 8 | uimsbf |
| reserved_zero_8bits | 8 | bslbf |
| level_idc | 8 | uimsbf |
| layer_parameter_present_flag | 1 | bslbf |
| reserved | 7 | bslbf |
| if ( layer_parameter_present_flag == '1') { | | |
| layer_max_bit_rate | 32 | uimsbf |
| reserved | 8 | bslbf |
| layer_max_buffer_size | 32 | uimsbf |
| reserved | 8 | bslbf |
| } | | |
| } | | |

The following definitions are provided for the scalable video descriptor. These may be parameters in additional layer parameter settings 204-A:

profile_idc—This 8-bit field indicates the profile, as defined in the HEVC specification.

reserved_zero_8bits—This 8-bit field shall be copied from the 8 bits immediately following the profile_idc syntax element in the sequence_parameter_set according to the HEVC specification.

level_idc—This 8-bit field indicates the level, as defined in the HEVC specification.

Layer_parameter_present_flag—This 1-bit flag when set to '1' indicates that the syntax elements describing a new layer buffer parameters are included in this descriptor.

Layer_max_bit_rate—This 32-bit field indicated the maximum bit rate of new layer video to the input of buffer.

Layer_max_buffer_size—This 32-bit field indicated the maximum buffer size of new layer video.

In another embodiment, a hierarchy descriptor may be used as shown in Table II according to one embodiment. The HEVC hierarchy descriptor provides information to identify the program elements containing components of HEVC scalable video with spatial, temporal, SNR, view-texture and view-depth scalability. Additional transport stream parameter settings 204-A may be included in the hierarchy descriptor.

TABLE II

HEVC Hierarchy descriptor

| Syntax | No. of bits | Mnemonic |
| --- | --- | --- |
| hierarchy_ descriptor( ) { | | |
| descriptor_tag | 8 | uimsbf |
| descriptor_length | 8 | uimsbf |
| Reserved | 1 | bslbf |
| temporal_scalability_flag | 1 | bslbf |
| spatial_scalability_flag | 1 | bslbf |
| quality_scalability_flag | 1 | bslbf |
| view_scalability_texture_flag | 1 | bslbf |
| view_scalability_depth_flag | 1 | bslbf |
| Reserved | 2 | bslbf |
| hierarchy_layer_index | 6 | uimsbf |
| Reserved | 2 | bslbf |
| hierarchy_embedded_layer_index | 6 | uimsbf |
| Reserved | 2 | bslbf |
| } | | |

The following are definitions of portions of the hierarchy descriptor:

temporal_scalability_flag—A 1-bit flag, which when set to '0' indicates that the associated program element enhances the temporal rate (such as frame rate) of the bit-stream resulting from the program element referenced by the hierarchy_embedded_layer_index. The value of '1' for this flag is reserved.

spatial_scalability_flag—A 1-bit flag, which when set to '0' indicates that the associated program element enhances the spatial resolution of the bit-stream resulting from the program element referenced by the hierarchy_embedded_layer_index. The value of '1' for this flag is reserved.

quality_scalability_flag—A 1-bit flag, which when set to '0' indicates that the associated program element enhances the SNR quality or fidelity of the bitstream resulting from the program element referenced by the hierarchy_embedded_layer_index. The value of '1' for this flag is reserved.

view_scalability_texture_flag—A 1-bit flag, which when set to '0' indicates that the associated program element enhances the texture view scalability of the bit-stream resulting from the program element referenced by the hierarchy_embedded_layer_index. The value of '1' for this flag is reserved.

view_scalability_depth_flag—A 1-bit flag, which when set to '0' indicates that the associated program element enhances the depth view scalability of the bit-stream resulting from the program element referenced by the hierarchy_embedded_layer_index. The value of '1' for this flag is reserved.

hierarchy_layer_index—The hierarchy_layer_index is a 6-bit field that defines a unique index of the associated program element in a table of coding layer hierarchies. Indices shall be unique within a single program definition. For video sub-bitstreams of HEVC video streams conforming to one or more scalable profiles this is the program element index, which is assigned in a way that the bitstream order will be correct if associated enhancement layer representations of the video sub-bitstreams of the same access unit are re-assembled in increasing order of hierarchy_layer_index.

hierarchy_embedded_layer_index—The hierarchy_embedded_layer_index is a 6-bit field that defines the hierarchy_layer_index of the program element that needs to be accessed and be present in decoding order before decoding of the elementary stream associated with this HEVC_hierarchy_descriptor.

The following will describe an example of a syntax that may be used to signal an operation point descriptor. As mentioned above, different signaling mechanisms may be used to signal the presence of an operation point. In one embodiment, the operation point may be signaled indirectly using other SEIs in the video stream. Alternatively, parameters for the operation points may be signaled using a new SEI in video or in the transport stream using a descriptor. The use of providing the operation point information to a single or each layer is also known as operation point description at the component level.

In some embodiments, transport of SHVC includes an explicit signaling of operation point to the decoders using a PMT descriptor. The use of the program level (e.g., via PMT) ensures that the operation point information is provided to all layers in the scalable video. This signals the combinations of base and other layers so that receivers can select the appropriate operation point (or combination to decode) based on their resources.

In some embodiments, the PMT includes an operation point descriptor that describes the characteristics of an operation point, such as a rendering capability value that describes a rendering capability for a receiving device and/or a decoding capability value that describes a decoding capability for a receiving device. The rendering capability may provide a number of views to be displayed, frame rate or the video data for the views, etc. In some embodiments, the operation point descriptor includes bitrate information, such as average bitrate or maximum bitrate for the operation point.

In some embodiments, the signaling of operation point (descriptor scheme) can be used when a new layer is added to the archived content in the future. For example, a new layer can be added to enhance 1080P60 to 4K×2K P60. In such a scenario, the operation point descriptor may be updated in the PMT whenever the layers provided/used are modified.

In another embodiment, an operation point descriptor may be used as shown in Table III according to one embodiment. The HEVC operation point descriptor provides information to indicate profile and level for one or more HEVC operation points, which signal decoder capability. HEVC operation point descriptor is included program_map section of transport stream. Table III gives an example of the syntax elements in such an operation point descriptor.

TABLE III

HEVC operation point descriptor

| Syntax | No. Of bits | Mnemonic |
|---|---|---|
| HEVC_operation_point_descriptor( ) { | | |
|   reserved | 2 | bslbf |
|   num_ptl | 6 | uimsbf |
|   for ( i = 0; i < num_ptl; i++, i++ ) { | | |
|     profile_tier_level_info[i] | 96 | bslbf |
|   } | | |
|   operation_points_count | 8 | uimsbf |
|   for ( i = 0; i < operation_points_count; i++ ) { | | |
|     target_ols [i] | 8 | uimsbf |
|     ES_count[i] | 8 | uimsbf |
|     for ( j = 0; j < ES_count[i]; j++ ) { | | |
|       reserved | 1 | bslbf |
|       prepend_dependencies[i][j] | 1 | bslbf |
|       ES_reference[i][j] | 6 | uimsbf |
|     } | | |
|     reserved | 2 | bslbf |
|     numEsInOp[i] | 6 | uimsbf |
|     for ( k = 0; k < NumESinOP[i]; k++ ) { | | |
|       necessary_layer_flag[i][k] | 1 | bslbf |
|       output_layer_flag[i][k] | 1 | bslbf |
|       ptl_ref idx[i][k] | 6 | uimsbf |
|     } | | |
|     reserved | 1 | bslbf |
|     avg_bit_rate_info_flag[i] | 1 | bslbf |
|     max_bit_rateinfo_flag[i] | 1 | bslbf |
|     constant_frame_rate_info_idc[i] | 2 | uimsbf |
|     applicable_temporal_id[i] | 3 | uimsbf |
|     if ( constant_frame_rate_info_idc[i] > 0) { | | |
|       reserved | 4 | bslbf |
|       frame_rate_indicator[i] | 12 | uimsbf |
|     } | | |
|     if ( avg_bit_rate_info_flag[i] == '1' ) { | | |
|       avg_bit_rate[i] | 24 | uimsbf |
|     } | | |
|     if ( max_bit_rate_info_flag[i] == '1' ) { | | |
|       max_bit_rate[i] | 24 | uimsbf |
|     } | | |
|   } | | |
| } | | |

Semantic definition of fields in HEVC operation point descriptor num_ptl—This 6-bit field specifies the number of profile, tier and level structures signaled in this descriptor.

profile_tier_level_info[i]—This 96-bit field shall be coded according to the syntax structure of profile_tier_level defined in sub-clause 7.3.3 of the Rec. ITU-T H.265| ISO/IEC 23008-2 with the value of profilePresentFlag set equal to 1 and maxNumSubLayersMinus1 set equal to 6.

If multiple HEVC operation point descriptors are found for the same program, all profile_tier_level_info[x] elements of all HEVC operation point descriptors for this program are aggregated in their order of occurrence into a common array, which is referenced in this specification as profile_tier_level_array[ ]. If there is only a single HEVC operation point descriptor, profile_tier_level_array[ ] contains the elements profile_tier_level_info[x] in the order as found in that single descriptor.

operation_points_count—This 8-bit field indicates the number of HEVC operation points described by the list included in the following group of data elements.

target_ols[i]—An 8-bit field that specifies the index into the list of output layer sets in the VPS, associated with the i-th HEVC operation point defined in this descriptor.

ES_count[i]—This 8-bit field indicates the number of ES_reference values included in the following group of data elements. The aggregation of elementary streams, according to the ordered list indicated in the following group of data elements, forms an HEVC operation point. The value 0xff is reserved.

Let OperationPointESList[i] be the list of ESs that are part of the i-th HEVC operation point.

prepend_dependencies[i][j]—This flag if set to 1 specifies that the ES indicated by ES_reference[i][j], when not present yet in OperationPointESList[i], shall be added into OperationPointESList[i] and the ES indicated by the syntax element hierarchy_embedded_layer_index in the hierarchy descriptor, or all of the ESs indicated by the syntax element hierarchy_ext_embedded_layer_index in the HEVC hierarchy extension descriptor, with the hierarchy layer index value specified by the following syntax element ES_reference[i][j], when not present yet in OperationPointESList[i], shall be added into OperationPointLayerList[i] immediately before the ES signalled by the ES_reference[i][j] in ascending order of the value of their associated hierarchy_embedded_layer_index or hierarchy_ext_embedded_layer_index. When the value of prepend_dependencies[i][j] is equal to 0, only the ES indicated by ES_reference[i][j], when not present yet in OperationPointESList[i], shall be added into OperationPointESList[i]. The ES indicated by ES_reference[i][m] shall be placed earlier (i.e., with a lower index) into OperationPointESList[i] than the ES indicated with ES_reference[i][n] when m is less than n. The order of ES in the OperationPointESList[i] shall be in ascending order of their hierarchy_layer_index values.

ES_reference[i][j]—This 6-bit field indicates the hierarchy layer index value present in the hierarchy descriptor or HEVC hierarchy extension descriptor which identifies an elementary stream. The value of ES_reference[i][m] and ES_reference[i][n] for m not equal to n shall not be the same.

NumESinOP[i]—This 6-bit field indicates the number of ESs in OperationPointESList[i] after all the ESs that are part of the i-th HEVC operation point have been included into OperationPointESList[i](e.g., after parsing prepend_dependencies[i][ES_count[i]—1]).

necessary_layer_flag[i][k]—This flag when set to '1' indicates that the k-th ES in OperationPointESList[i] is a necessary layer, as defined in 23008-2, of the i-th operation point. This flag equal to '0' indicates that the k-th ES in OperationPointESList[i] is not a necessary layer, as defined in Annex F of Rec. ITU-T H.265|ISO/IEC 23008-2, of the i-th operation point.

output_layer_flag[i][k]—This flag when set to '1' indicates that the k-th ES in OperationPointESList[i] is an output layer. Otherwise, when set to '0', it indicates that the k-th ES in OperationPointESList[i] is not an output layer. When the value of necessary_layer_flag[i][k] is equal to 0, the value of output_layer_flag[i][k] shall be ignored.

ptl_ref_idx[i][k]—A 6-bit field that indicates the index x to the profile_tier_level_info[x] element of the profile_tier_level_array which applies to the k-th ES in OperationPointESList[i]. When the value of necessary_layer_flag[i][k] is equal to 0, the value of ptl_ref_idx[i][k] shall be ignored.

avg_bit_rate_info_flag[i]—This flag indicates whether the syntax element avg_bit_rate[i] is present in this descriptor.

max_bit_rate_info_flag[i]—This flag indicates whether the syntax element max_bit_rate[i] is present in this descriptor.

constant_frame_rate_info_idc[i]—This 2-bit field, in combination with the syntax element frame_rate_indicator as specified below, indicates how the frame rate for the associated operation point j is determined. The value of 0 indicates that the frame rate is not specified for the i-th HEVC operation point and that the syntax element frame_rate_indicator is not present in this descriptor for i-th HEVC operation point.

applicable_temporal_id[i]—This 3-bit field indicates the highest value of TemporalId of the VCL NAL units in the re-assembled HEVC video stream for operation point i.

frame_rate_indicator[i]—If constant_frame_rate_info_idc[i] is equal to 1, this 12-bit field indicates a constant number of ticks, as specified in the HEVC timing and HRD descriptor, for the distance in time between two pictures at the i-th HEVC operation point. If constant_frame_rate_info_idc[i] equals 2, this 12-bit field indicates the frame rate for the i-th operation point measured in frames per second. If constant_frame_rate_info_idc[i] equals 3, this 12-bit field indicates the frame rate for i-th HEVC operation point measured in frames per 1.001 seconds.

avg_bit_rate[i]—This 24-bit field indicates the average bit rate, in 1000 bits per second, of the HEVC layered video stream corresponding to the i-th HEVC operation point.

max_bit_rate[i]—This 24-bit field indicates the maximum bit rate, in 1000 bits per second, of the HEVC layered video stream corresponding to the i-th HEVC operation point.

Figure 8:
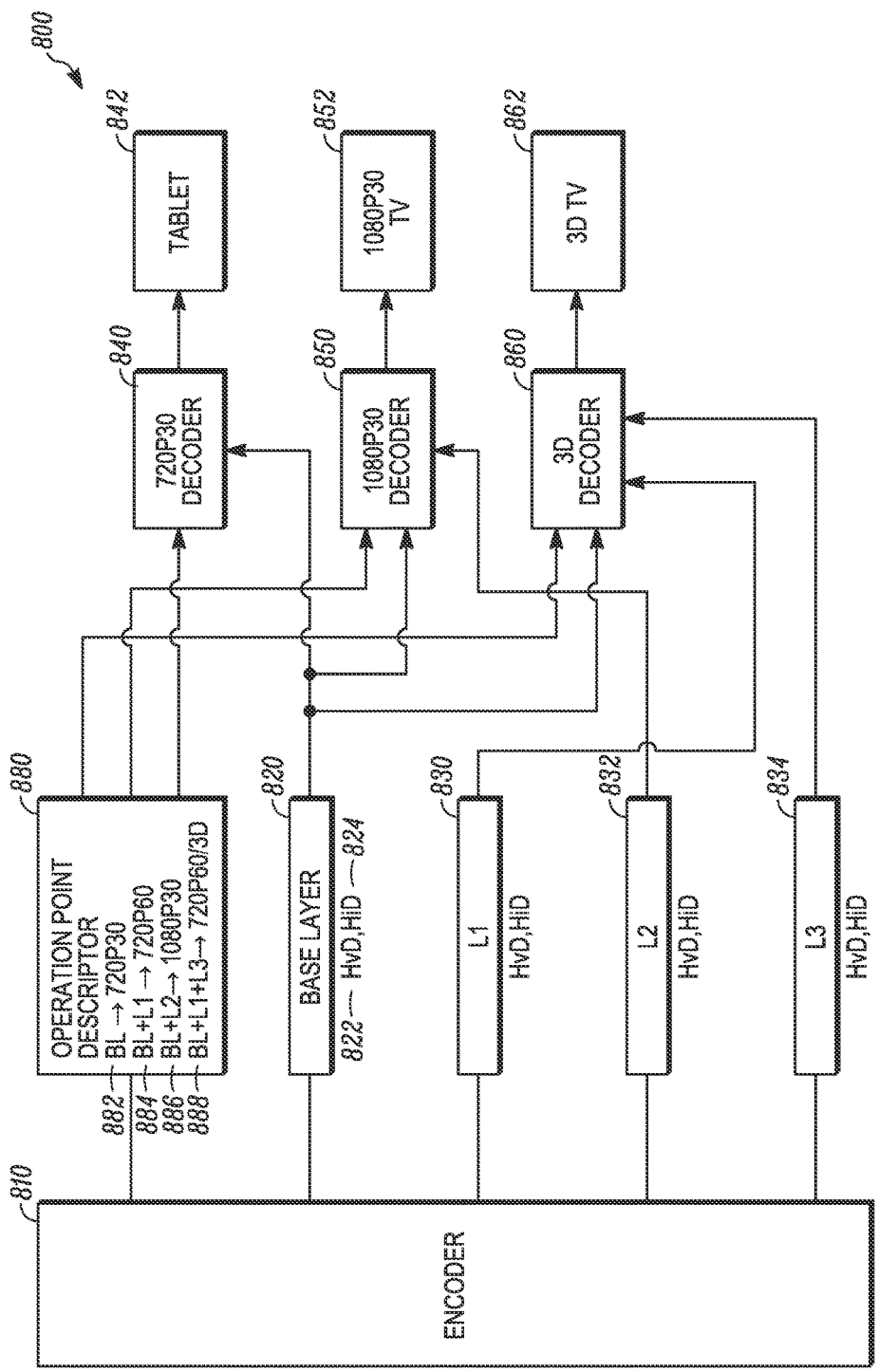
FIG. 8 depicts an example of a destination device using an operation point descriptor according to one embodiment.

FIG. 8 depicts an example of a destination device using an operation point descriptor according to one embodiment. The overall system 800 in FIG. 8 includes an encoder 810, a base layer 820, a first enhancement layer L1 830, a second enhancement layer L2 832, a third enhancement layer L3 834, a first decoder 840, a second decoder 850, a third decoder 860, a first destination device 842, a second destination device 852, a third destination device 862, and an operation point descriptor 880. Encoder 810 encodes the base layer 820 and enhancement layers 830, 832, 834 into encoded bitstreams. Base layer 820 and enhancement layers 830, 832, 834 may include video descriptors 822 and hierarchy descriptors 824. In some embodiments, encoder 810 also encodes the operation point descriptor 880 having a plurality of operations points 882, 884, 886, 888. As shown, operation point descriptor 880 provides information such as: operation point 882 indicates a transmission capability of 720P30 should retrieve the base layer 820; operation point 884 indicates a transmission capability of 720P60 should retrieve the base layer 820 and the first enhancement layer L1 830; operation point 886 indicates a transmission capability of 1080P30 should retrieve the base layer 820 and the second enhancement layer L2 832; operation point 888 indicates a transmission capability of 720P60/3D should retrieve the base layer 820, the first enhancement layer L1 830, and the third enhancement layer L3 834.

As provided above, by providing a plurality of operation points to the destination devices 840, 850, 860, the destination devices 840, 850, 860, may select which layers to receive, based on the destination device's 840, 850, 860 capabilities. For example, different operation points signal the combinations of base and other layers so that the destination devices can select the appropriate operation point (or combination to decode) based on their resources. As an example, if a transmission that includes 720P30 enhanced to 720P60 and further enhanced to 1080P60 with 3D, signals three operation points—720P30, 720P60 and 3D 1080P60, destination devices can choose the right operation point based on whether they are displaying video on a tablet, or HDTV, or 3DTV, respectively.

This follows that destination device 842, a tablet, could retrieve operation point descriptor 880 and select base layer 820 based on operation point 882 and decoder 840 capabilities. Destination device 852, a 1080P30 TV, could retrieve operation point descriptor 880 and select base layer 820 and second enhancement layer L2 832 based on operation point 886 and decoder 850 capabilities. Destination device 862, a 3D TV, could retrieve operation point descriptor 880 and select base layer 820, the first enhancement layer L1 830, and the third enhancement layer L3 834 based on operation point 888 and decoder 860 capabilities.

In an aspect, a method of signaling individual layers in a transport stream includes: determining a plurality of layers in a transport stream, wherein each layer includes a respective transport stream parameter setting; determining an additional layer for the plurality of layers in the transport stream, wherein the additional layer enhances one or more of the plurality of layers including a base layer and the respective layer parameter settings for the plurality of layers do not take into account the additional layer; and determining an additional transport stream parameter setting for the additional layer, the additional transport stream parameter setting specifying a relationship between the additional layer and at least a portion of the plurality of layers, wherein the additional transport stream parameter setting is used to decode the additional layer and the at least a portion of the plurality of layers. In an embodiment of the aspect, the method further includes sending the additional layer and the at least a portion of the plurality of layers with each respective transport stream parameter setting and the additional transport stream parameter setting to a decoder. In an embodiment of the aspect, the additional transport stream parameter setting is included in a video descriptor in the transport stream. In an embodiment of the aspect, the respective transport stream parameter settings for each of the plurality of layers in the transport stream are included in a video descriptor in the transport stream. In an embodiment of the aspect, the method further includes setting a parameter indicating that additional layers may be added to the at least a portion of the plurality of layers in the transport stream. In an embodiment of the aspect, the parameter in the transport stream indicates that the additional transport stream parameter setting will be included in the transport stream. In an embodiment of the aspect, the additional transport stream parameter setting specifies layer specific information for the additional layer. In an embodiment of the aspect, the additional transport stream parameter setting specifies layer dependent information for the additional layer and the at least a portion of the plurality of layers. In an embodiment of the aspect, the additional transport stream parameter setting includes a maximum bit rate for the additional layer and the at least a portion of the plurality of layers. In an embodiment of the aspect, the additional transport stream parameter setting includes a maximum buffer size for the additional layer and the at least a portion of the plurality of layers. In an embodiment of the aspect, the transport stream includes HEVC, scalable HEVC (SHVC), multiview HEVC (MV HEVC), or combinations thereof.

In an aspect, an apparatus includes: one or more computer processors; and a computer readable storage medium comprising instructions that, when executed, cause the one or more processors to: determine a plurality of layers in a transport stream, wherein each layer includes a respective transport stream parameter setting; determine an additional layer for the plurality of layers in the transport stream, wherein the additional layer enhances one or more of the plurality of layers including a base layer and the respective layer parameter settings for the plurality of layers do not take into account the additional layer; determine an additional transport stream parameter setting for the additional layer, the additional transport stream parameter setting specifying a relationship between the additional layer and at least a portion of the plurality of layers, wherein the additional transport stream parameter setting is used to decode the additional layer and the at least a portion of the plurality of layers; and send the at least a portion of the plurality of layers and the additional layer to a decoder along with respective transport stream parameter settings for the at least portion of the plurality of layers and the additional transport stream parameter setting. In an embodiment of the aspect, the plurality of layers in the transport stream is encoded. In an embodiment of the aspect, the instructions further cause the one or more processors to: encode the additional layer, wherein the plurality of layers is not re-encoded and the respective transport stream parameter settings for the plurality of layers are not changed. In an embodiment of the aspect, send includes adding the additional transport stream parameter setting into a transport stream for the additional layer and at least a portion of the plurality of layers. In an embodiment of the aspect, the additional transport stream parameter setting includes a maximum bit rate for the additional layer and the at least a portion of the plurality of layers. In an embodiment of the aspect, the additional transport stream parameter setting includes a maximum buffer size for the additional layer and the at least a portion of the plurality of layers.

In an aspect, an apparatus includes: one or more computer processors; and a computer readable storage medium comprising instructions that, when executed, cause the one or more processors to: receive a plurality of layers in a transport stream, wherein each layer includes a respective transport stream parameter setting; receive an additional layer for the plurality of layers in the transport stream, wherein the additional layer enhances one or more of the plurality of layers including a base layer and the respective layer parameter settings for the plurality of layers do not take into account the additional layer; receive an additional transport stream parameter setting for the additional layer, the additional transport stream parameter setting specifying a relationship between the additional layer and at least a portion of the plurality of layers, wherein the additional transport stream parameter setting is used to decode the additional layer and the at least a portion of the plurality of layers; and decode the at least a portion of the plurality of layers and the additional layer using the respective transport stream parameter settings for the at least a portion of the plurality of layers and the additional transport stream parameter setting. In an embodiment of the aspect, the additional transport stream parameter setting specifies layer specific information for the additional layer. In an embodiment of the aspect, in the additional transport stream parameter setting specifies layer dependent information for the additional layer and the at least a portion of the plurality of layers.

Particular embodiments may be implemented in a non-transitory computer-Readable storage medium for use by or in connection with the instruction execution system, apparatus, system, or machine. The computer-Readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

We claim:

1. A method for decoding individual layer parameters signaled in a transport stream including a high efficiency video coding (HEVC) layered stream with a plurality of HEVC temporal layers in the transport stream carried in separate elementary streams, the method comprising:

receiving an HEVC video descriptor including one or more syntax elements in the HEVC video descriptor that apply to the whole HEVC layered video stream;

determining from the HEVC video descriptor one or more elements that indicate whether the plurality of HEVC temporal layers are present in one or more spatial layers in the HEVC layered video stream, wherein one or more of the plurality of HEVC temporal layers are carried in respective elementary streams;

receiving at least one extension descriptor that extends the HEVC video descriptor for each elementary stream having an associated HEVC temporal layer in the HEVC layered video stream; and wherein the at least one extension descriptor includes operation point information signaled in the transport stream using an operation point descriptor, the transport stream carrying the operation point descriptor in a Program Map Table (PMT), wherein the one or more spatial layers in the HEVC layered video stream in the transport stream include at least one of one combined layer that includes a base layer and an enhancement layer or individual layers that include a separate base layer and one or more enhancement layers.

2. The method of claim 1, further comprising:

identifying, using the operation point descriptor, a maximum bit rate.

3. The method of claim 1, wherein the individual layers comprise one enhancement layer and an additional enhancement layer that has been added.

4. The method of claim 3, further comprising receiving in the transport stream at least one of the bitrate, rendering capability, and decoding capability of the additional enhancement layer.

5. The method of claim 4, further comprising selecting and rendering the additional enhancement layer in the PMT.

6. The method of claim 1, wherein the transport stream indicates a scalable enhancement for the transport stream.

7. The method of claim 6, wherein the scalable enhancement comprises a spatial, temporal, and/or signal-to-noise ratio (SNR) enhancement.

8. The method of claim 6, wherein scalable enhancement comprises a view-depth and/or view-texture enhancement.

9. The method of claim 1, wherein the transport stream comprises HEVC, scalable HEVC (SHVC), multiview HEVC (MV HEVC), or combinations thereof.

* * * * *